(12) United States Patent
Yang

(10) Patent No.: US 6,312,027 B1
(45) Date of Patent: Nov. 6, 2001

(54) SHOCK ABSORBING SYSTEM FOR AN AUTOMOTIVE VEHICLE

(76) Inventor: Chin-Hun Yang, 3F., No. 5, Ta-His Rd., Shih Lin District, Taipei (TW)

( * ) Notice: Subject to any disclaimer, the term of this patent is extended or adjusted under 35 U.S.C. 154(b) by 0 days.

(21) Appl. No.: 08/877,794

(22) Filed: Jun. 18, 1997

(51) Int. Cl.[7] ................................................ B60R 19/40
(52) U.S. Cl. ......................................................... 293/118
(58) Field of Search ............................ 293/118, 119, 293/134

(56) References Cited

U.S. PATENT DOCUMENTS

| | | | |
|---|---|---|---|
| 3,346,292 | * 10/1967 | Lundman | 293/118 |
| 3,355,208 | * 11/1967 | Brock | 293/118 |
| 3,934,912 | * 1/1976 | Ogihara et al. | 293/119 |
| 3,947,061 | * 3/1976 | Ellis | 293/118 |
| 4,474,257 | * 10/1984 | Lee | 293/118 |
| 4,518,183 | * 5/1985 | Lee | 293/118 |
| 4,932,697 | * 6/1990 | Hun | 293/134 |
| 5,096,242 | * 3/1992 | Chin-Hun | 293/118 |

* cited by examiner

*Primary Examiner*—Gary C. Hoge
(74) *Attorney, Agent, or Firm*—A & J

(57) ABSTRACT

A shock-absorbing system for as automotive vehicle. the system comprises a hydraulic oil circuit which includes a storage tank for storing hydraulic oil, electric motor for driving the pump. Front and rear bumper subsystems for respectively extending and retracting of front rear bumpers, a pressure, a electric circuit subsystem for controlling valves, and valves control subsystem.

1 Claim, 12 Drawing Sheets

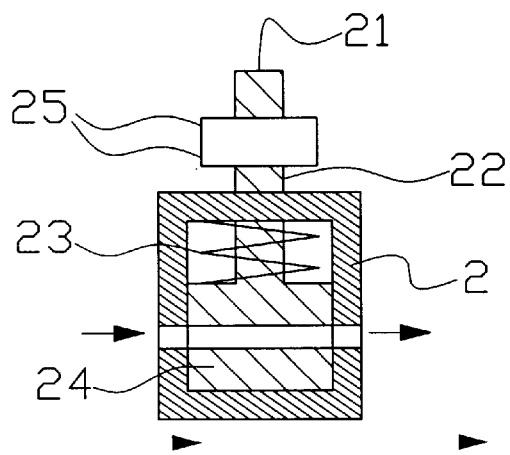
FIG. 2
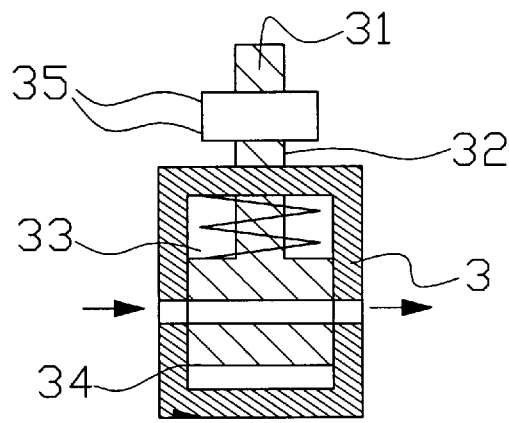
FIG. 3
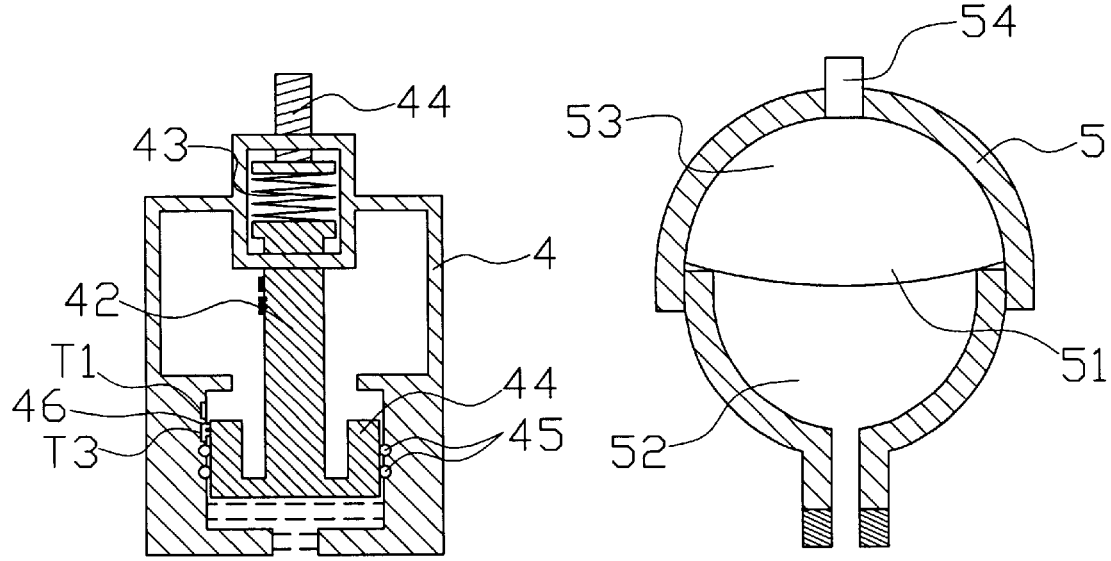
FIG. 4
FIG. 5

SHOCK ABSORBING SYSTEM FOR AN AUTOMOTIVE VEHICLE

BACKGROUND OF THE INVENTION

The present invention relates to a shock-absorbing system for an automotive vehicle, and more particularly to a auto-actuated shock-absorbing bumper system for absorbing external impacts due to a collision of the vehicle with another vehicle of object.

Conventional bumpers of vehicle are securely connected to the end of the vehicle body, under such circumstances, if the vehicle collides with another vehicle or other objects, an impact energy directly is transferred to the vehicle, resulting in severe damage of the vehicle and passengers. Applicant's U.S. Pat. No. 5,096,242 offers a brake-actuated extending bumper for absorbing shock. The prevent invention provides further advanced shock-absorbing system to protect the vehicle and passengers.

SUMMARY OF THE INVENTION

It is an object of the present invention to provide a shock-absorbing bumper system for vehicles, in which the system operates actuation of a speedmeter of the vehicle. It is another object of the present invention to provide a shock-absorbing bumper system for vehicles, in which besides an accumulator is provided to absorb shock due to collision, and can supplied the hydraulic pressure to the power steering system and the power brake system, when the engine pump is not running.

It is still another object of the present invention to provide a shock-absorbing bumper system in which microswitches provided electric source to opening the relief valves and closing the cut-off valve, releasing excessive pressure and preventing pressure too high, causing the engine pump and two systems will be damaged, when a collision occurs.

BRIEF DESCRIPTION OF THE DRAWING

The invention, as well as it many advantages, may be future understood by the falling detailed description and drawings in which:

FIG. 2 is a schematic view showing a cut-off valve utilized in the present invention;

FIG. 3 is a schematic view showing a relieving valve utilized in the present invention;

FIG. 4 is a schematic view of a hydraulic pressure sensing/controlling means in accordance with the present invention;

FIG. 5 is a schematic view of an accumulator in accordance with the present invention, in which the accumulator is in a status before a collision occurs;

FIGS. 9A through 9E are schematic views showing switches in connect with the valves in accordance with the present invention;

FIG. 1: electric pump or engine pump
   1-1 tank
   2 cut-off valve
   3-1, 3-2 relief valves
   4 hydraulic pressure sensing/controlling means valve
   5 accumulator
   6 solenoid valve
   7-1, 7-2, 7-3, 7-4 microswitches
   8-1, 8-2, 8-3, 8-4 actuators
   9 check valve
   10 limiting valve
   11 front bumper
   11 rear bumper
   12 hydraulic block
   024 power steering system
   025 power brake system
FIG. 2: cut-off valve
   21 coil
   22 lead rod
   23 spring
   24 lining
   25 terminal
FIG. 3: relief valve
   31 coil
   32 lead rod
   33 spring
   34 lining
   35 terminal
FIG. 4: hydraulic pressure sensing/controlling means
   41 piston head
   42 piston rod
   43 spring
   44 adjustable screw
   45 seals
   46 contact blade
   T1 transmits to the start switch
   T2 transmits to the electric pump
FIG. 5: accumulator
   51 spring blade
   52 lower chamber
   53 upper chamber
   54 nozzle
FIG. 6: solenoid valve
  6-1 brake pedal is not depressed and oil path direction
  6-2 brake pedal is depressed and without hit oil path direction
  6-3 brake pedal is depressed and hit, oil path direction
FIG. 7: microswitch
  71 contact blade
  72 spring
  73 lead rod
  74 sleeve
  75 terminal
  T1 transmits to the master switch
  T2 transmits to relief valve and cut-off valve
FIG. 8: actuator
  81 lead rod base
  82 piston rod
  83 piston
  84 first chamber
  85 second chamber
  86 spring
FIG. 10: bumper and actuator install forms
  10-1 hide form
  10-2 open form

DETAILED DESCRIPTION OF THE EMBODIMENTS

Figure 1:
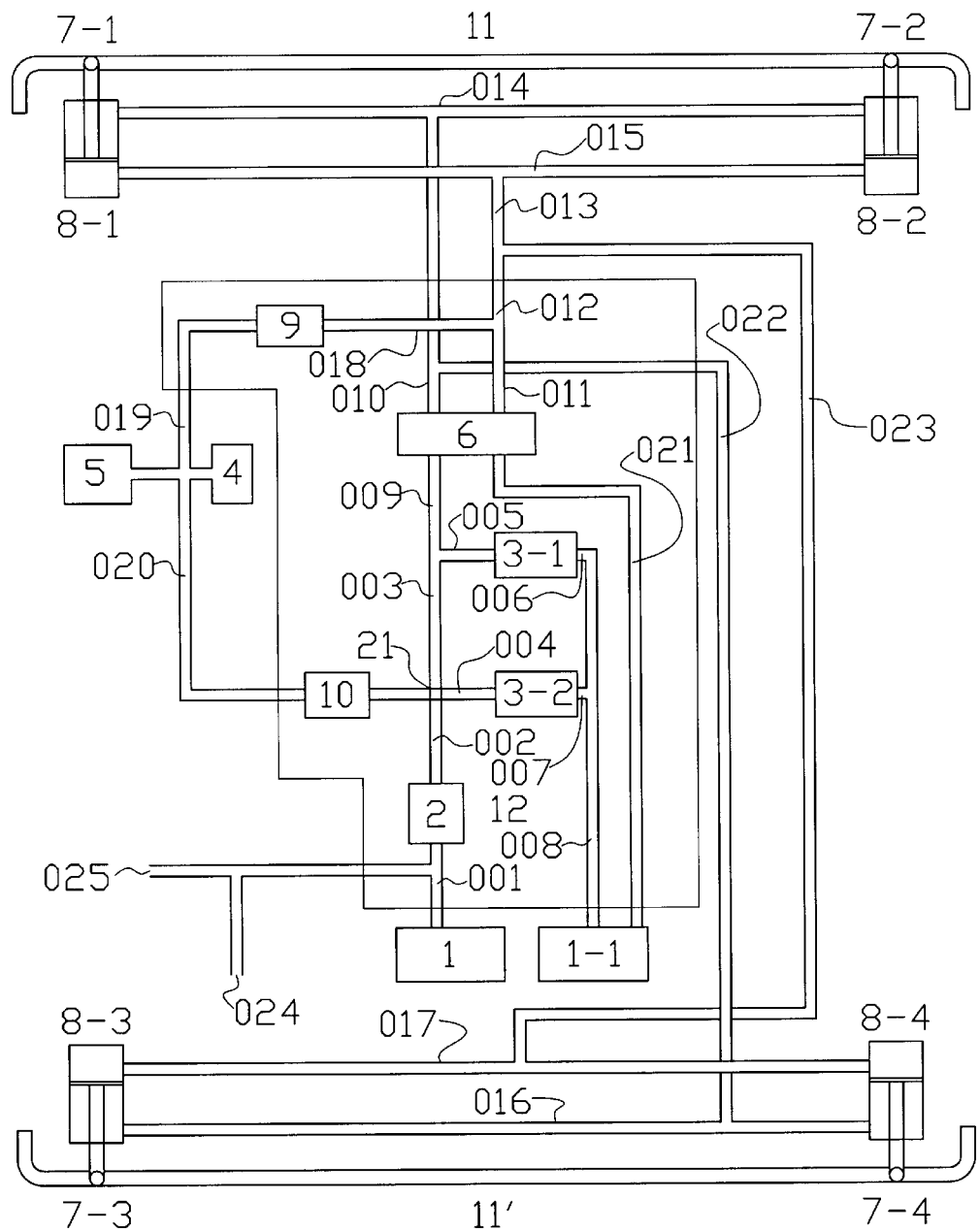
FIG. 1 is a schematic view of a shock-absorbing bumper system for vehicles in accordance with the present invention.

Referring to FIG. 1, a shock-absorbing bumper system according to the present invention includes a supply subsystem, a pressure-balancing subsystem, valves control subsystem, front and rear bumper subsystems, electric circuit subsystems, and a conduit system has a plurality of oil paths for connecting above subsystems. The supply subsystem includes a tank 1-1 for storage of working fluid, such as hydraulic oil. A first end of a first oil path 001 communicates with the pump 1 and a second end of the first oil path 001 communicates with a cut-offvalve 2. A pump 1, which is the power source of the working fluid, is provided adjacent to the tank 1-1. In the pressure-balancing subsystem, a first end of a second oil path 002 communicates with a cut-off valve 2, a first end the cross joint 21 communicates with a second end of a second oil path 002. A limiting valve 10 is provided between the second end of the crossjoint 21 and the second end of the twentieth oil path 020. A third end of the cross joint 21 communicates with a first end of a third oil path 003, which has a second end communicates with a first end of a ninth oil path 009 and a first end of a fifth oil path 005, ninth oil path 009 has a second end communicating with a first portion 601 (cf. FIG. 6A) of a solenoid valve 6 of valves control subsystem, and a first end of a fifth oil path 005 is between a second end of a third oil path 003 and a first end of a ninth oil path 009, a second end of a fifth oil path 005 communicates with a relief valve 3-1, a sixth oil path 006 communicates with the relief valve 3-1 at a first end thereof and a second end of the sixth oil path 006 communicates with a first end of a eighth oil path 008, which has a second end communicates with the tank 1-1. A fourth end of the cross joint 21 communicates with a first end of a fourth oil path 004, which has a second end communicates with a relief valve 3-2, a seventh oil path 007 communicates with the relief valve 3-2 at a first end thereof and a second end of the seventh oil path 007 communicates with a eighth oil path 008, which has a second end communicates with the tank 1-1. A first end of a eighteenth oil path 018 communicates with between a second end of a eleventh oil path 011 and a first end of a twelfth oil path 012. A check valve 9 is provided between a second end of a eighteenth oil path 018 and a first end of a nineteenth oil path 019, a hydraulic pressure sensing/controlling means 4 and an accumulator 5 are between a second end of a nineteenth oil path 019 and a first end of a twentieth oil path 020.

Referring to FIG. 1 and further to FIG. 2. A cut-off valve 2 which is provided between a second end of a first oil path 001 and a first end of a second oil path 002. The cut-offvalve 2 comprises a coil 21, a lead rod 22, a spring 23, a lining 24, a lead rod 22 connecting with the lining 24. When the coil 21 amassed magnetic, the lead rod 22 and the lining 24 move upward due to contraction force of the spring 23, so the orifice is closed, (when a collision occurs) preventing reverse pressure too high, cause the pump 1 and two other systems 024, 025 damage. When the coil 21 is not amassed magnetic, the lead rod 22 and the lining 24 move downward due to extending force of the spring 23, so the orifice is opened, the working fluid flows from the second end of the first oil path 001 to the first end of the second oil path 002. The cut-off valve 2 is controlled by four microswitches 7-1, 7-2, 7-3, 7-4. The cut-off valve 2 maintains its normally open position.

Referring to FIG. 1 and further to FIG. 3, there are two relief valves 3-1, 3-2. A relief valve 3-1 provided between the second end of the fifth oil path 005 and the first end of the sixth oil path 006. A cut-off valve 3-2 provided between the second end of the fourth oil path 004 and the first end of the seventh oil path 007. The cut-off valve comprises a coil 31, a spring 33, a lead rod 32 connecting with a lining 34. When a collision occurs, the coil 31 amassed magnetic, the lead rod 32 and the lining 34 move upward, the orifice is opened, allowing working fluid to enter the tank 1-1, thereby releasing excessive pressure. When the coil 31 has not amass magnetic,the lead rod 32 and the lining 34 move downward, due to extending force of the spring 33, so the orifice is closed, prevent working fluid to enter the tank 1-1. A a relief valve 3-1 is controlled by microswitches 7-1 and 7-3, another relief valve 3-2 is controlled by microswitches 7-2 and 7-4. The relief valves 3-1, 3-2 is always inclosed position.

Referring to FIG. 1 and further to FIG. 4, a hydraulic pressure sensing/controlling means 4 is provided between a second end of the nineteenth oil path 019 and a first end of the twentieth oil path 020. The hydraulic pressure sensing/controlling means 4 comprises a piston head 41, a lead rod 42, a spring 43, a adjustable screw 44, two seals 45, A contact blade 46, a start switch 13 and two terminals T1, T2, the piston head 41 connecting with the lead rod 42, T1 electrically connect with the start switch 13, T2 electrically connect with the electric pump 1. When the pressure of the working fluid is too low, the extending force of spring 42 pushes the piston head 41 and the lead rod 42 downward so that contact blade 46 connects with T1 and T2, starting the pump 1 to supply working fluid. When the pressure of the working fluid reaches a desired level, the piston head 41 and lead rod 42 moves upward due to pressure of the working fluid is larger than tension of the spring 43, and the contact blade 46 is disconnected with T1 and T2, stopping the pump 1. An adjustable screw 44, which can adjust pressure of the working fluid, when system needed high pressure, the adjustable screw 44 turns clockwise. If needs low pressure, the adjustable screw 44 turns counterclockwise. Two seals 45 are provided on the piston head 41, for preventing the working fluid from leaking into the air chamber.

Referring to FIG. 1 and 5. The accumulator 5 which is provided between the nineteenth oil path 019, the twentieth oil path 020. The accumulator 5 includes a spring blade 51, a lower chamber 52, an upper chamber 53, and a nozzle 54, thereof, a spring blade 51 defines an upper chamber 53 and a lower chamber 52. The upper chamber 53 is filled with gas, such as nitrogen, and the lower chamber 52 is filled with working fluid. A nozzle 54 is provided on the upper chamber 53 for supply gas into the upper chamber 53 when the pressure inside the upper chamber 53 is too low. The pressure in the upper chamber 53 equals a pre-set value, for example, 700 psi. If the pressure of the working fluid in the twentieth oil path 020 and the twenty-first oil path 021 is below 700 psi (no collision occurs), the spring blade 51 is not moved. If the pressure of working fluid in the twentieth oil path 020 and the twenty-first oil path 021 increases to be above 700 psi (a collision occurs), the spring blade 51 is moved upward to absorb excessive pressure resulting from the impact due to the collision. The accumulator also provided pressure of the hydraulic fluid to the power steering system and power brake system, when the engine pump is not running.

A check valve 9 is provided between the eighteenth oil path 018 and the nineteenth oil path 019, such that it is impossible for working fluid to flow into the eighteenth oil path 018, ie; working fluid is only flowable from the eighteenth oil path 018 to the accumulator 5 via the nineteenth oil path 019. The check valve 9 is mainly for providing a by pass oil path for preventing the working oil being jammed when a sever vehicle collision occurs. The structure and operation of the check 9 is conventional and will not be further described.

A limiting valve 10 is provided between the twentieth oil path 020 and cross joint 21, limiting the pressure and amount of working fluid flowing from the accumulator 5 to the cross joint 21, the flowing of working fluid is not limited from the cross joint 21 to the accumulator 5 in the normal condition. when a collision occurs and pressure in accumulator 5 is too high, parts of the working fluid may flow back to the tank 1-1 via limiting valve 10, so that the system pressure is maintain with a safety range.

Figure 6A:
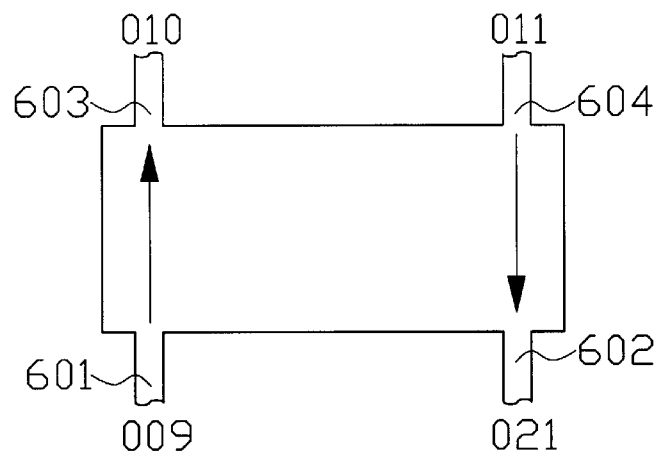
FIGS. 6A through 6C are schematic views showing fluid communication of a solenoid valve in accordance with the present invention.
Figure 6B:
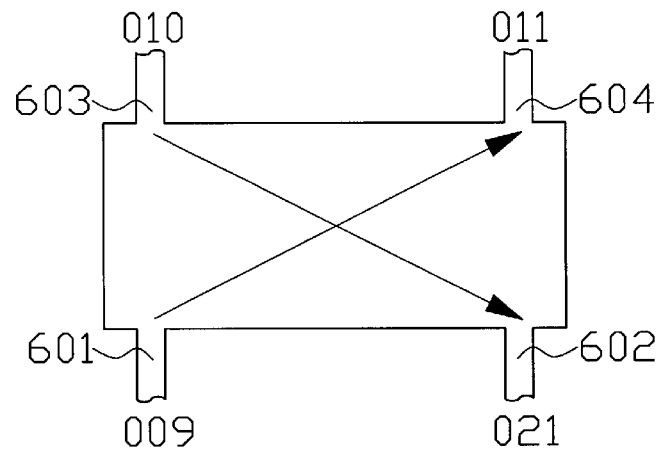
Figure 6C:
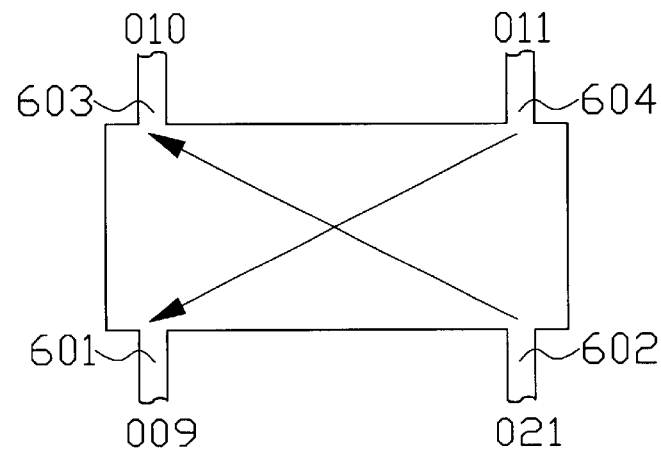

Referring to FIG. 1, and further to FIGS. 6A through 6C, in the switching subsystem, as illustrated above, the first port 601 of the solenoid valve 6 communicates with the ninth oil path 009. A second port 602 of the solenoid valve 6 communicates with the tank 1-1 via a twenty-first oil path 021. A third port 603 of the solenoid valve 6 communicates with a first end of a tenth oil path 010 which branches into the fourteenth oil path 014 and the sixteenth oil path 016 via the twenty-second oil path 022. A fourth port 604 of the solenoid valve 6 communicates with a first end of a twelfth oil path 012 via a eleventh oil path 011, the twelfth oil path 012 branches into the fifteenth oil path 015 via a thirteenth oil path 013 and the seventeenth oil path 017 via the twenty-third oil path 023.

In a first mode of the solenoid valve 6, working fluid is flowable from the ninth oil path 009 to the tenth oil path 010, and from the eleventh oil path 011 to the twenty-first oil path 021, as shown in FIG. 6A. In a second mode of the solenoid valve 6, working fluid is flowable from the ninth oil path 009 to the eleventh oil path 011, and from the tenth oil path 010 to the twenty-first oil path 021, as shown in FIG. 6B. In a third mode of the solenoid valve 6, working fluid is flowable from the eleventh oil path 011 to the ninth oil path 009, and from the twenty-first oil path 021 to the tenth oil path 010, as shown in FIG. 6C.

Figure 7:
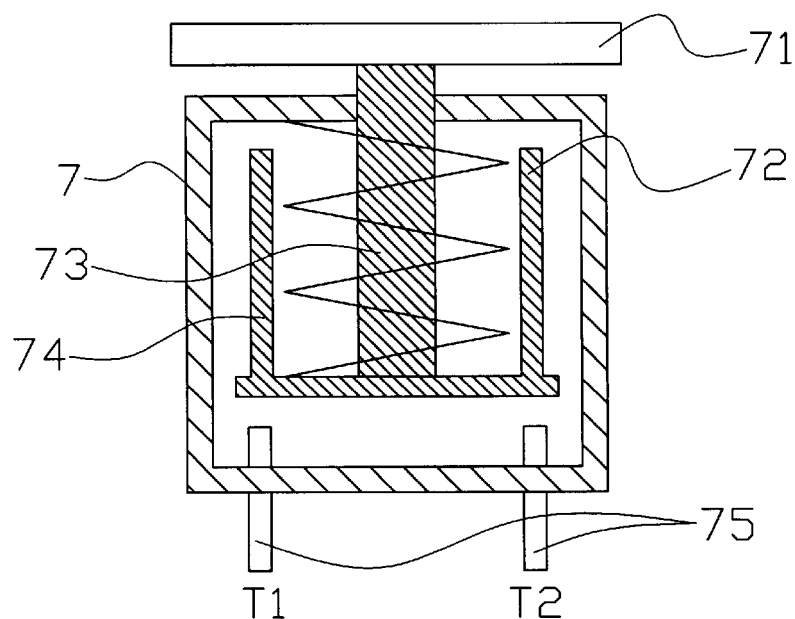
FIG. 7 is a schematic view showing a microswitch utilized in the present invention.

Referring to FIG. 7. A microswitch 7, which is mounted the front of he piston rod 82. The microswitch 7 comprises a contact blade 71, a spring 72, a lead rod 73, a sleeve 74, two terminals 75. The lead rod 73 connecting with a contact blade 71 and a sleeve 74, a terminal 1 communicates with the master switch 14, a terminal 2 communicates with the cut-off valve 2 and relief valves 3-1 or 3-2. When a pressure forces the lead rod 73 which moves downward and spring 72 extending, two terminals are contacted by the contact blade 71, the electric source transmits from terminal 2 to the cut-off valve 2 and relief valves 3-1, 3-2. If the bumpers are not hit, ie; no collision occurs, lead rod 73 moves upward, due to the retraction of the spring 72, so the contact blade 71 disconnect with T1 and T2, the electric source will not transmit from terminal 2 to the cut-off valve 2 and relief valves 3-1 or 3-2. The microswitch 7-1 or 7-3 controls the cut-off valve 2 and relief 3-1, and the microswitch 7-2 or 7-4 controls the cut-off valve 2 and relief valve 3-2 (cf. FIG. 9B)

Figure 8:
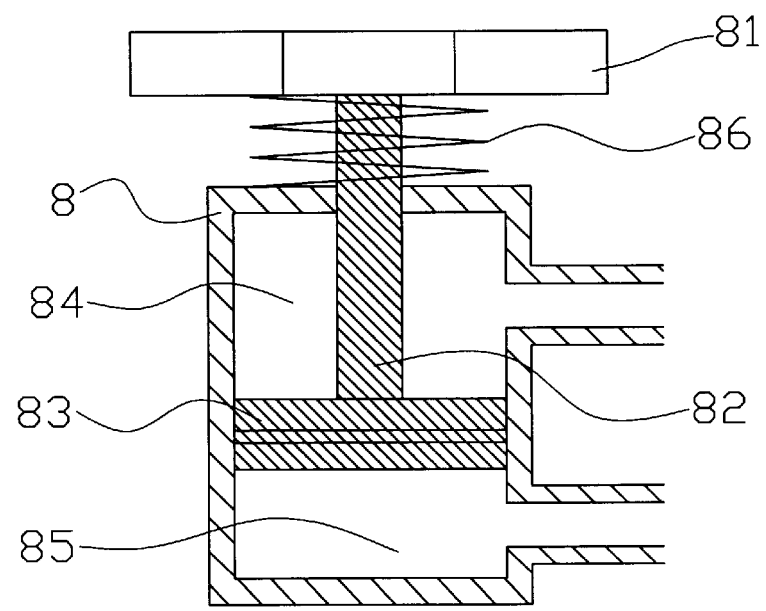
FIG. 8 is a schematic view of an actuator of the shock-absorbing bumper system in accordance with the present invention.

Referring to FIG. 1, and FIG. 8, the front bumpers subsystem comprises a front bumper 11 and two spaced first actuators 8 provided behind two corners of the front bumper 11. Each of the actuator 8 has a piston 83 therein defining a first chamber 84 and a second chamber 85. The piston 83 is rigidly connected to the front bumper 11 via a piston rod 82 at a first side thereof. A fourteenth oil path 014 communicates with a front portion of each of the space actuator 8. A fifteenth oil path 015 communicates with a rear portion of each of he spaced actuator 8. A second end of the thirteenth oil path 013 communicates with the fifteenth oil path 15 and the first end of the thirteenth oil path 013 communicates with the second end of the twelfth oil path 012 and the first end of the twenty-third oil path 023, as illustrated above.

Similarly, the rear bumper subsystem comprises a rear bumper 11' and two spaced second actuators 8 provided behind (as seen from the rear side of the vehicle) the rear bumper 11'. The structure of the second actuators 8 are the same as that of the first actuators 8 in FIG. 8; no further description is required.

The sixteenth oil path 016 communicates with a front portion of each of the spaced second actuators 8. A seventeenth oil path 017 communicates with a rear portion of each of the spaced second actuators 8. A second end of the twenty-third oil path 023 communicates with the seventeenth oil path 017, a first end of the twenty-third oil path 023 communicates between a second end of the twelfth oil path 012 and a first end of the thirteenth oil path 013, as illustrated above. The sixteenth oil path 016 communicates with the fourteenth oil path 014 via the twenty-second oil path 022 and the tenth oil path 010, as illustrated above.

A spring 86 is provided between a front end of the actuator 8 and a bottom side of the bumper 11 (this configuration not affecting the function of the spring 86). The spring 86 which is in addition to absorbing impact, and returns the piston 83 to a neutral position as shown in this figure.

When the bumper is subjected to an impact, working fluid within the second chambers 85 transfers the high pressure to the accumulator 5, which absorbs the impact, providing a first protection. The spring 86 absorbs any remaining impact, providing a second protection.

Figure 9:
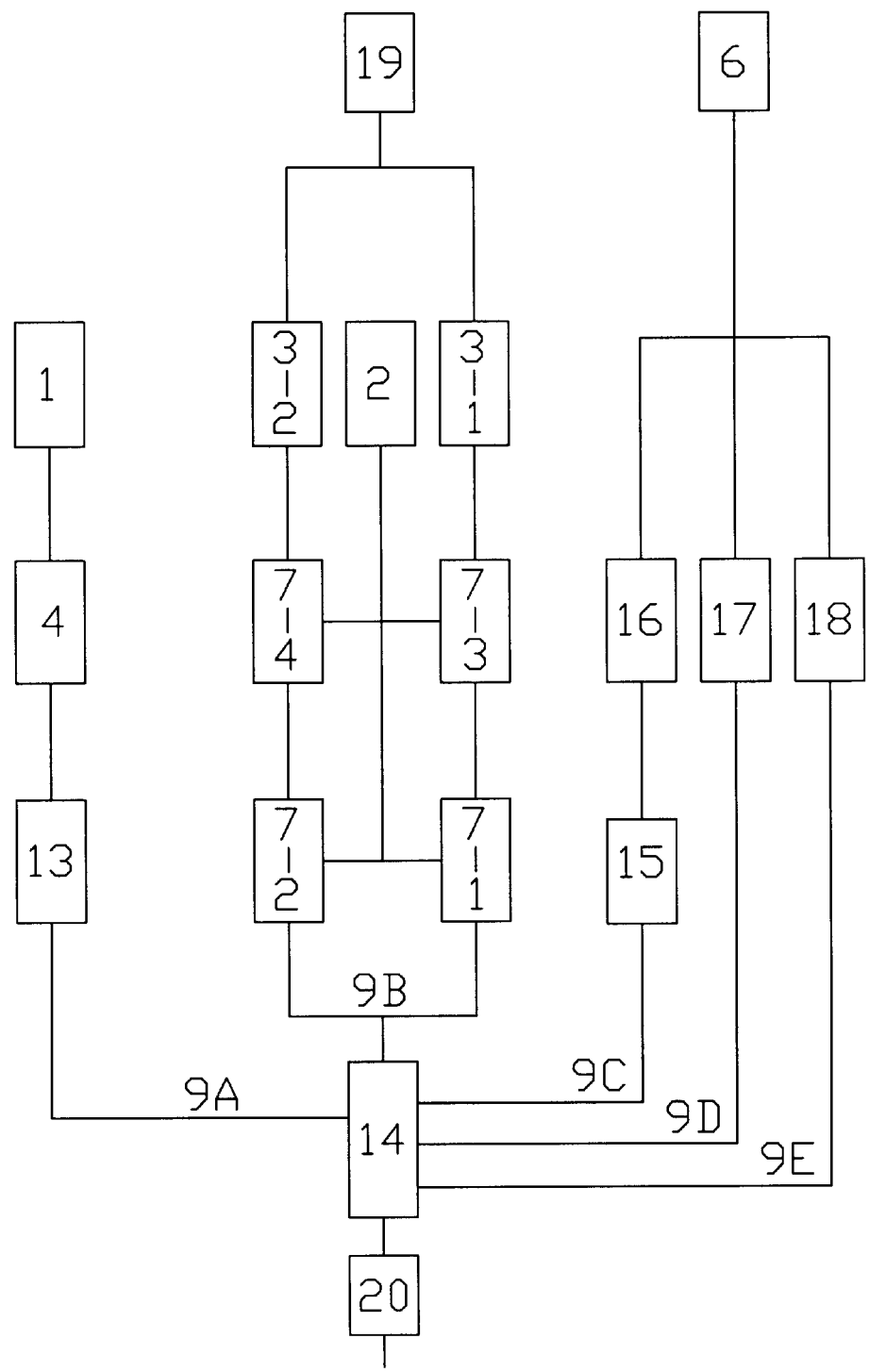
FIG. 9: electric circuit graph
  1 pump
  2 cut-off valve
  3-1, 3-2 relief valves
  4 hydraulic pressure sensing/controlling means
  6 solenoid valve
  7-1, 7-2, 7-3, 7-4 microswitches
  13 start switch
  14 master switch
  15 hand brake switch
  16 brake pedal switch
  17 automatic switch
  18 speedmeter switch
  19 maintain switch
  20 relay

Referring to FIGS. 9A through 9E, a electric circuit subsystem, which are provided a start switch 13 electrically connect with the pump 1 via the hydraulic pressure sensing/controlling means 4. FIG. 9A. The master switch 14 electrically connect with the relief valve 3-1 via the leftfront microswitch 7-1 and the leftrear microswitch 7-3, the master switch 14 electrically connect with the relief valve 3-2 via the rightfront micro switch 7-2, and the rightrear micro switch 7-4. Four micro switches 7-1, 7-2, 7-3, 7-4 electrically connect with the cut-off valve 2. The maintain switch 19 electrically connect with relief valves 3-1, 3-2. If maintenance is required, a technician may release the pressure in the conduits by the relief valves 3-1, 3-2, avoiding personal injury caused by pressurized working fluid sprayed from the conduits during detachment (cf. FIG. 9B).

In the operation respect, the master switch 14 may individually controls solenoid valve 6, the brake pedal switch 16 via the hand brake switch 15 (cf. FIG. 9C ), also selects the automatic switch 17 (cf. FIG. 9D) or the speedmeter switch 18 (cf. FIG. 9E) to controls the solenoid valve 6.

The hand brake putted down and when the brake pedal of the vehicle is depressed (no collision occurs), the electric source transmits from the master switch 14 to the solenoid valve 6 via the hand brake switch 15 and the brake pedal switch 16, the solenoid valve 6 is switched to its second mode (cf. FIG. 6B). If the bumpers are hit, the electric source transmits from the master switch 14 branches to the leftfront microswitch 7-1 or the leftrear microswitch 7-3, thereby, the relief valve 3-1 opens, and the cut-off valve 2 closes, and another electric source from the rightfront microwitch 7-2 or the rightrear microswitch 7-4, thereby, the relief valve 3-2 opens, and the cut-off valve 2 closes.

If the front bumper 11 is hit, the electric source transmits from the master switch 14 branches to the leftfront microswitch 7-1 and the rightfront microswitch 7-2, thereby, the relief valves 3-1 and 3-2 open, the cut-off valve 2 closes. If the rear bumper is hit, the electric source transmits from the master switch 14 branches to the leftrear microswitch 7-3 and the rightrear microswitch 7-4, thereby, the relief valves 3-1, 3-2 open, the cut-off valve 2 closes. If the one side of the bumper is hit, for example, the leftfront side, the electric source transmits from the leftfront microswitch 7-1 to the relief valve 3-1 opens and the cut-off valve 2 closes. Operation and function of the leftrear microswitch 7-3 are the same as those of the leftfront microswitch 7-1, and thus will not be further described.

If the rightrear side, the electric source transmits from the ightrear microswitch 7-4 to the relief valve 3-2 opens and the cut-off valve 2 closes. Operation and function of the rightfront microswitch 7-2 of the rightfront side are the same as those of the rightrear microswitch 7-4, and thus will not be further described.

Besides, there are two methods to control the solenoid valve 6. The speedmeter controls (cf. FIG. 9E), when the speed reaches a predetermined level, the electric source transmits to the solenoid valve 6 via the speedmeter switch 18, the solenoid valve 6 is switched to its second mode (cf. FIG. 6B), the front and rear bumper 11, 11' move outward to extending position. If the speed is below a pre-determined level the electric source will not transmits to the solenoid valve 6, which is switched to its first mode (cf. FIG. 6A) the front and rear bumper 11, 11' move inward to retraction position. Another method is controlled by automatic switch 17 which directly controls the solenoid valve 6. When the automatic switch 17 (cf. FIG. 9D) turns ON the electric source transmits to the solenoid valve 6, which is switched to its second mode (cf. FIG. 6B), the front and rear bumper 11, 11' move outward to extending position. When the automatic switch 17 turns OFF, the electric source will not transmits to the solenoid valve 6, which is switched to its first mode (cf. FIG. 6A). The front and rear bumpers 11, 11' move inward to retraction position.

A relay 20 is provided between the battery and the electric circuit subsystem, which are disconnected by the relay 20, during the engine suddenly stops. The solenoid valve 6 initially returned to the first mode (cf. FIG.6A), the relief valves 3-1, 3-2 are closed, the cut-off valve 2 is opened. The working fluid flows from the accumulator 6 to the power steering system 024 and power brake system 025 via the twentieth oil path 020, the limiting valve 10, the cross joint 21, the second oil path 002, the cut-off valve 2, and the first oil path 001. In the emergent condition, provide pressure of the working fluid to protect safety of the vehicle and passengers.

Figure 1A:
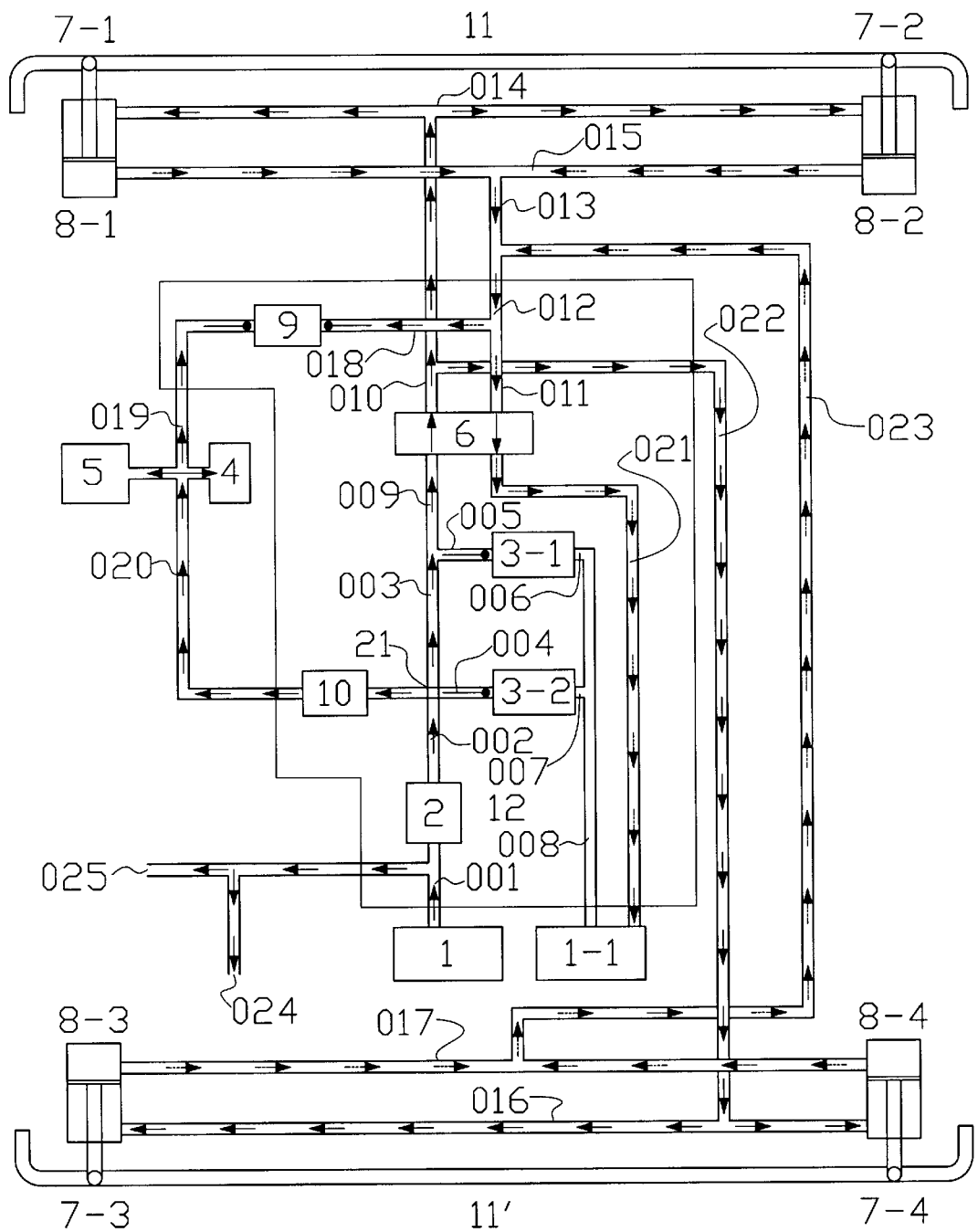
FIG. 1A is a schematic view of a shock-absorbing bumper system in accordance with the present invention, in which no collision occurs and the brake pedal is released.

Referring now to FIG. 1A, when the brake pedal of the vehicle is released and as illustrated above, the solenoid valve 6 is switched to its first mode (cf. FIG. 6A). Working fluid through the first oil path 001, the cut-offvalve 2, the second oil path 002, the cross joint 21, the third oil path 003 the ninth oil path 009, the solenoid valve 6, the tenth oil path 010, and then branches to the twenty-second oil path 022 and the fourteenth oil path 014, the working fluid of the fourteenth oil path 014 flows into the first chambers 84, pushing the piston 83, together with the piston rod 82, inward.

Similarly, the rear pumper 11' moves inward under the action of working fluid flowing to the sixteenth oil path 016, via the twenty-second oil path 022, as indicated by solid arrows in FIG. 1A.

Working fluid in the second chambers 85 of the actuators 8-1, 8-2 flow back to the tank 1-1 via oil paths 015, 013, 012 and 011, the solenoid valve 6, and the twenty-first oil path 021. Similarly, working fluid in the second chambers 85 of the actuators 8-3, 8-4 flow back to the tank 1-1 via oil paths 017, 023, 012 and 011, the solenoid valve 6, and the twenty-first oil path 021, as indicted by dashed arrows in FIG. 1A.

Figure 1B:
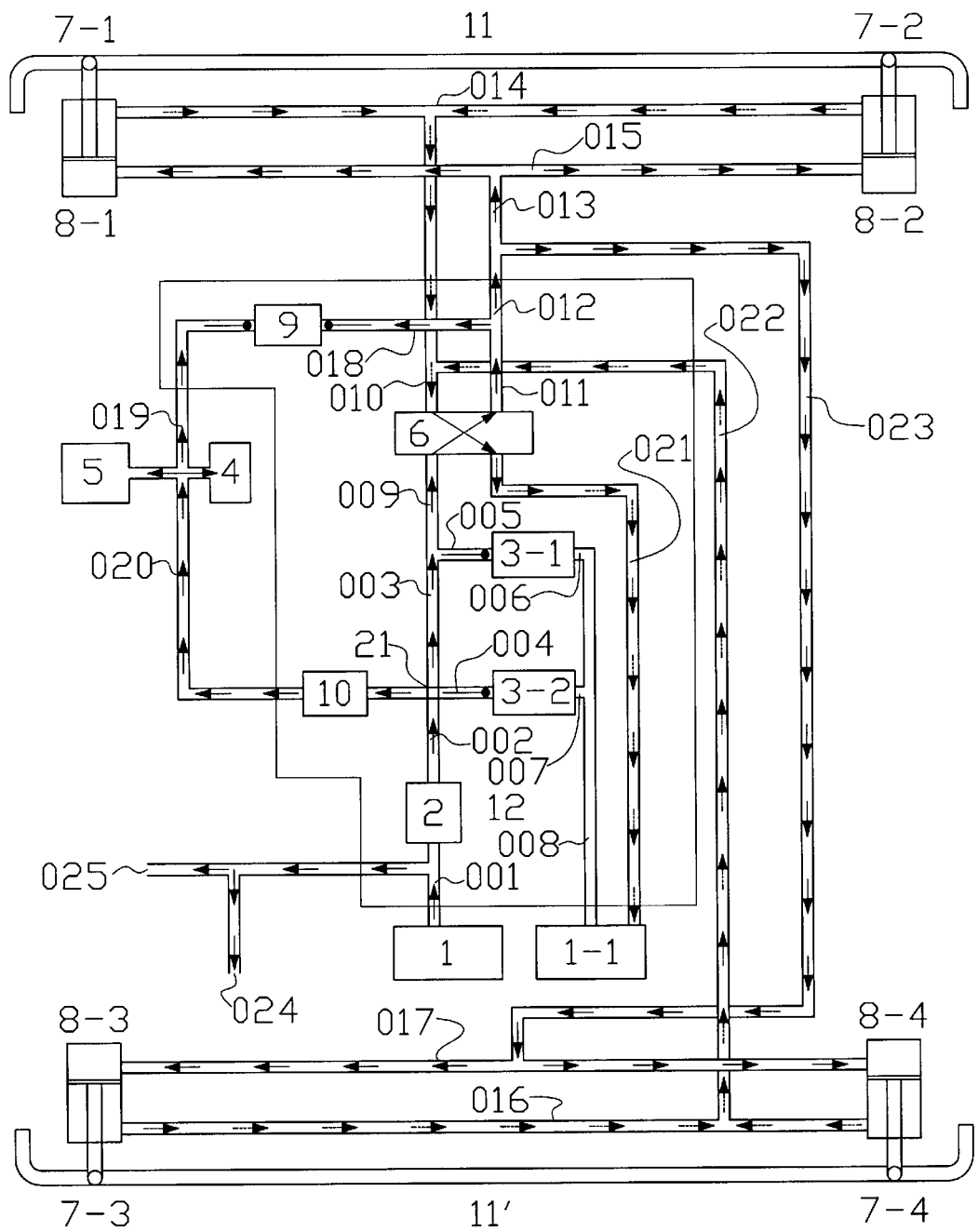
FIG. 1B is a schematic view of the shock-absorbing bumper system in accordance with the present invention, in which front and rear bumpers of a vehicle extend outward due to a depression of a rake pedal of the vehicle before a collision occurs.

Referring to FIG. 1B. When the brake pedal of the vehicle is depressed the bumpers are not hit, ie; no collision occurs, the solenoid valve 6 is switched to its second mode (cf. FIG. 6B). Working fluid flows through the first oil path 001, the cut-off valve 2, the second oil path 002, the cross joint 21, oil paths 003, 009, the solenoid valve 6, oil paths 011, 012, 013 and 015, working fluid enter the second chambers 85 of actuators 8-1, 8-2, pushing the piston 83, together with the piston rod 82, outward. Accordingly, the front bumper 11 moves outward to extending position. Similarly, the rear bumper 11' moves outward under the action of working fluid flows into the second chambers 85 of actuators 8-3, 8-4 via the twenty-third oil path 023 and the seventeenth oil path 017, as indicated by solid arrows in FIG. 1B.

Working fluid in the first chambers 84 of the actuators 8-1, 8-2 flows back to the tank 1-1 via oil paths 014 and 010, the solenoid valve 6, and the twenty-first oil path 021. Similarly, working fluid in the first chambers 84 of the actuators 8-3, 8-4 flows back to the tank 1-1 via oil paths 016, 022 and 010, the solenoid valve 6, and the twenty-first oil path 021, as indicated by dashed arrows in FIG. 1B.

Figure 1C:
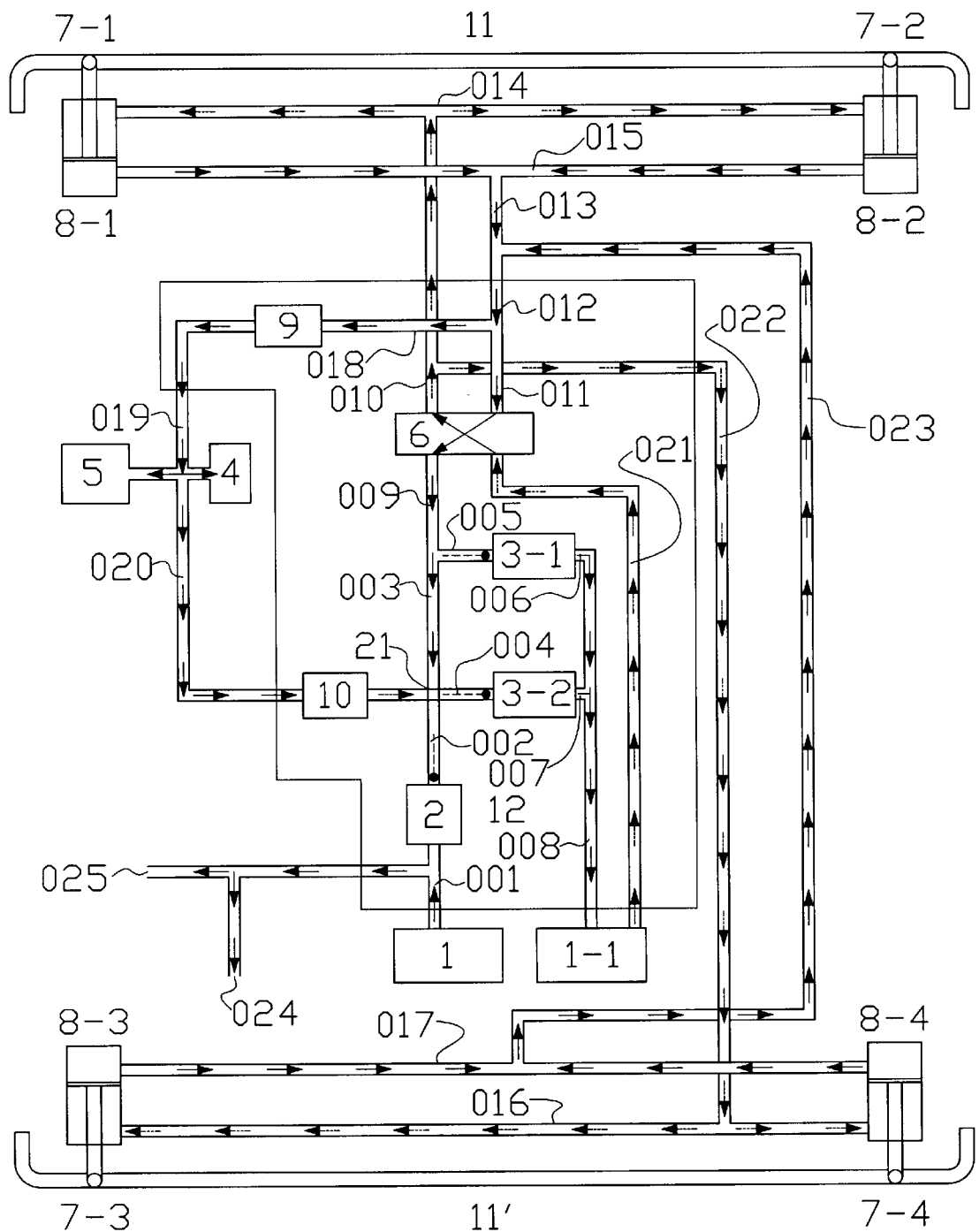
FIG. 1C is a schematic view of the shock-absorbing bumper system in accordance with the present invention, in which brake pedal is depressed and a collision occurs.

Referring to FIG. 1C, when the front of bumper 11 is hit, the working fluid of the solenoid valve 6 is switched from the second mode to the third mode,(cf. FIG. 6C). The working fluid flows to the twelfth oil path 012 via oil paths 015, 013, branches to the eighteenth oil path 018 and the eleventh oil path 011, most of the working fluid from the eighteenth oil path 018, the check valve 9, the nineteenth oil path 019, and into the accumulator 5, which absorbs most of the impact energy, if pressure of the accumulator 5 is too high, a part of working fluid can flows back to the tank 1-1 via the twentieth oil path 020, the limiting valve 10, the cross joint 21, the fourth oil path 004, the relief valve 3-2, and oil paths 007, 008. The remaining working fluid flows from the solenoid valve 6, the ninth oil path 009, which branches to the fifth oil path 005, the relief valve 3-1 (which is opened by the microswitch 7-1 controls), oil paths 006 and 008, then into the tank 1-1, another working fluid flows from the third oil path 003 to the tank 1-1 via the cross joint 21, the fourth oil path 004, the relief valve 3-2, (which is opened by the microswitch 7-2 controls), and oil paths 007, 008. Relief valves allow working fluid to enter the tank 1-1, as indicated by solid arrows in FIG. 1C. Thereby releasing excessive pressure. Meanwhile the cut-off valve 2 closes, which is controlled by microswitches 7-1, 7-2, preventing reverse pressure too high, to cause the pump 1, the power steering system 024 and the power brake system 025 being damaged.

Inward movement of the front bumper 11 causes an inward movement of the piston 83. Working fluid in the tank 1-1 is supplied to the first chambers 84 via the twenty-first oil path 021, the solenoid valve 6, the tenth oil path 010, and the fourteenth oil path 014, as indicated by dashed arrows in FIG. 1C. Subsequently, if the rear bumper 11' is subjected to tremendous impact, the solenoid valve 6 is also in its third mode (cf. FIG. 6C), the working fluid flows to the twelfth oil path 012 via oil paths 017 and 023, the twelfth oil path 012 branches into the eighteenth oil path 018 and the eleventh oil path 011, most of the working fluid flows from the eighteenth oil path 018 to the accumulate 5 via the check valve 9, the nineteenth oil path 019, in which absorbs most of the impact energy, if pressure of the a accumulate 5 is too high, a part of working fluid can flows back to the tank 1-1 via the twentieth oil path 020, the limiting valve 10, the cross joint 21, the four oil path 004, the relief valve 3-2, and oil paths 007 008. The remaining working fluid flows from the eleventh oil path 011 to the tank 1-1 via the solenoid valve 6, oil paths 009 and 005, the relief valve 3-1, and oil paths 006 and 008, another working fluid flows from the third oil path 003 to the tank 1-1 via the cross joint 21, the fourth oil path 004, the relief valve 3-2, and oil paths 007 and 008, as indicated by solid arrows in FIG. 1C. The cut-offvalve 2 is closed by microswitches 7-3, 7-4. Inward movement of the piston 83 of the actuators 8-3, 8-4. The working fluid of tank 1-1 flows into the firs chamber 84 of the actuators 8-3 via the twenty-first oil path 021, the solenoid valve 6, oil paths 010, 022 and 016, as indicated by dashed arrows in FIG. 1C.

Figure 1D:
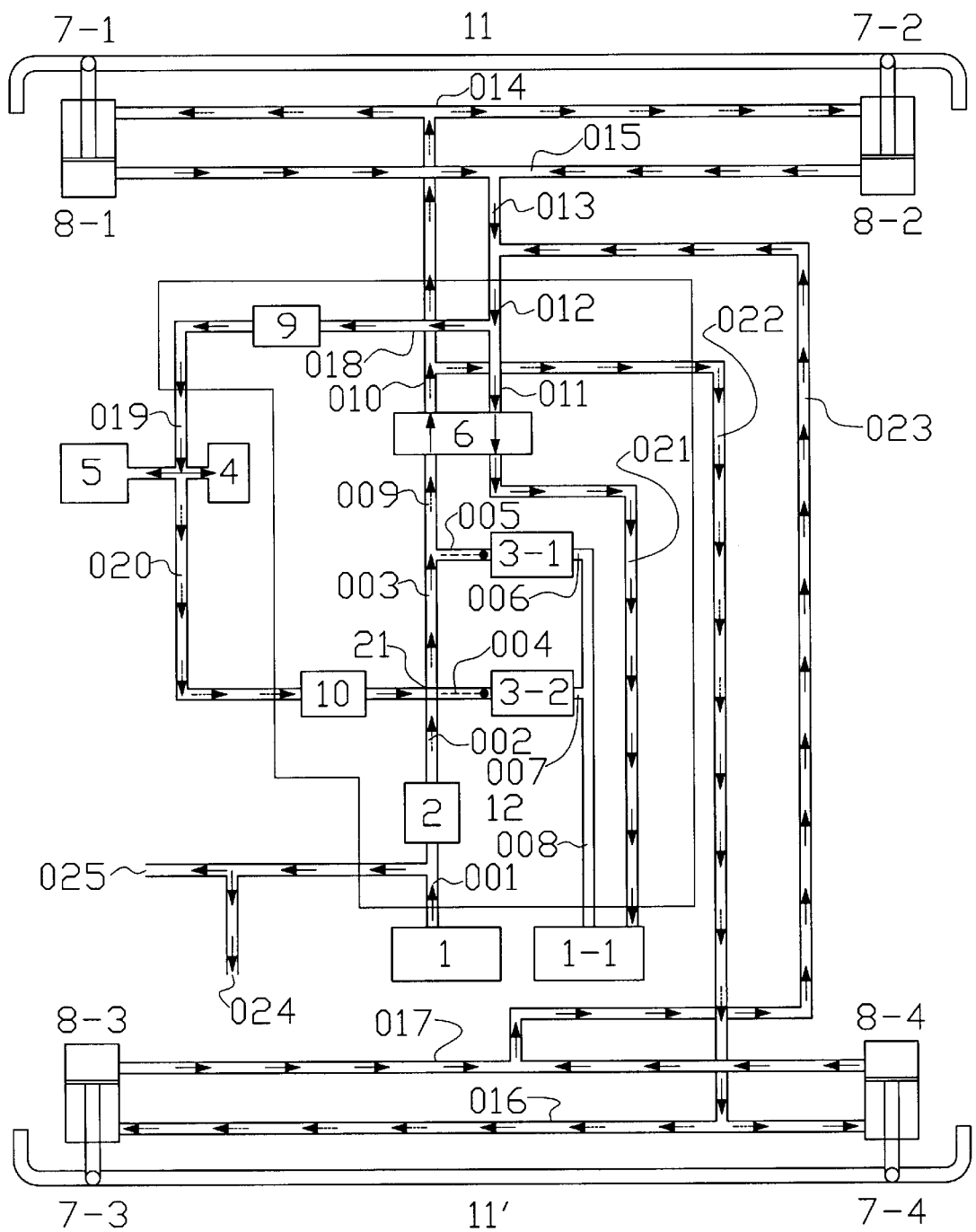
FIG. 1D is a schematic view of the shock-absorbing bumper system in accordance with the present invention, in which brake pedal is released and a slightly hit.

Referring to FIG 1D, the brake pedal is not depressed, the front of bumper 11 is slightly hit, the solenoid valve 6 is initially in the first mode (cf. FIG. 6A). The working fluid in the second chambers 85 of the actuators 8-1, 8-2 flows back to the tank 1-1 via oil paths 015, 013, 012 and 011, the solenoid valve 6, and the twenty-first oil path 021, as indicated by solid arrows in FIG. 1D.

Working fluid is supplied from the accumulator 5 to the first chambers 84 of the actuators 8-1, 8-2 and flows through the twentieth oil path 020, the limiting valve 10, the cross joint 21, the third oil path 003, the ninth oil path 009, the solenoid valve 6, and oil paths 010, 014. Because slightly hit,so the relief valves 3-1, 3-2 closed and the cut-off valve 2 opened, as indicated by dashed arrows in FIG. 1D.

IF the rear bumper 11' is slightly hit the brake pedal is not depressed, the working fluid in the second chambers 85 of the actuators 8-3, 8-4 flow back to the tank 1-1 via oil paths 017, 023, 012, 011, the solenoid valve 6, and the twenty-first oil path 021, as indicated by solid arrows in FIG. 1D.

Working fluid is supplied from the accumulator 5 to the first chambers 84 of the actuators 8-3, 8-4 and flows through the twentieth oil path 020, the limiting valve 10, the cross joint 21, the third oil path 003, the ninth oil path 009, the solenoid valve 6, and oil paths 010, 022, 016. Because being slightly hit, the relief valves 3-1, 3-2 closed and the cut-off valve 2 opened as indicated by dashed arrows in FIG. 1D.

Figure 1E:
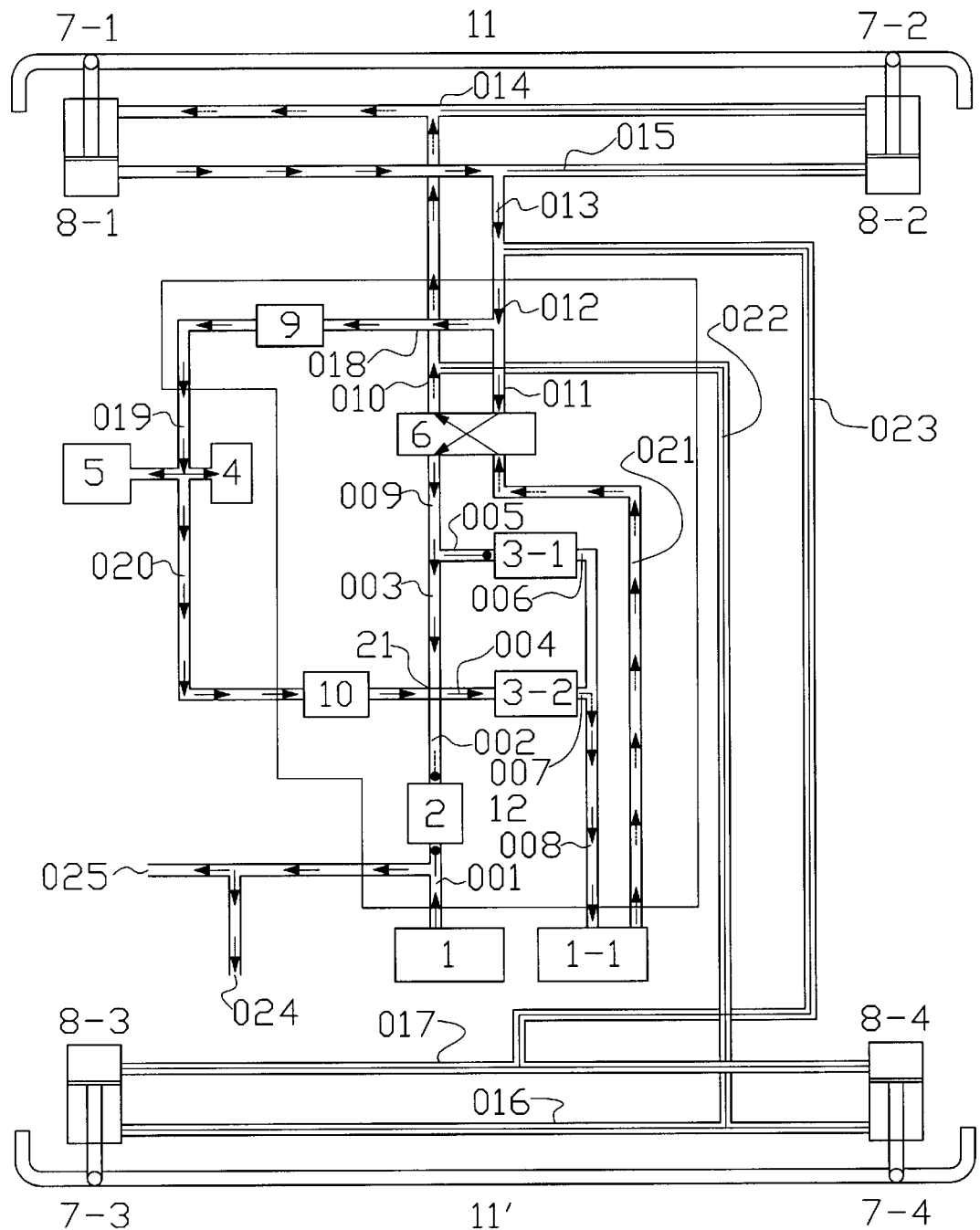
FIG. 1E is a schematic view of the shock-absorbing bumper system in accordance with the present invention, in which brake pedal is depressed and a leftfront collision occurs.

Referring to FIG. 1E, the brake pedal is depressed, a collision occurs at the oneside of the bumper, for example, the leftfront actuator 8-1 is subjected to tremendous impact. The solenoid valve 6 is in its third mode (cf. FIG. 6C), and as illustrated above, most of the working fluid flows from the oil paths 015, 013, 012, 018, the check valve 9, the nineteenth oil path 019, and into the accumulator 5. The remaining working fluid flows back to the oil tank, passing through the solenoid valve 6, oil paths 009, 005, the open relief valve 3-1(controlled by microswitch 7-1) and oil path 006,008 and the cut-offvalve 2 closes, (controlled by the microswitch 7-1), as indicated by solid arrows in FIG. 1E.

Due to inward movement of the piston 83, working fluid in the tank 1-1 is supplied to the first chamber 84 via the twenty-first oil path 021, the solenoid valve 6, oil paths 010, 014 as indicated by dashed arrows in FIG. 1E. Operation and function of the leftrear microswitch 7-3 are the same as those of the leftfront microswitch 7-1, and thus will not be further described.

If the rightrear actuator 8-4 is impacted, and as illustrated above, most of the working fluid flows from the oil paths 017, 023, 012, and the working fluid branches to the eighteenth oil path 018, through the check valve 9, the nineteenth oil path 019, and into the accumulator 5, which operates to absorb most of the impact energy. The remaining working flows to the eleventh oil path 011, passing through the solenoid valve 6, oil paths 009, 003, the cross joint 21, and the fourth oil path 004, meanwhile, the microswitch 7-4 electrically connected the relief valve 3-2 opens and the cut-off valve 2 closes, allows working fluid to enter the tank 1-1 as indicated by solid arrows in FIG. 1F.

Figure 1F:
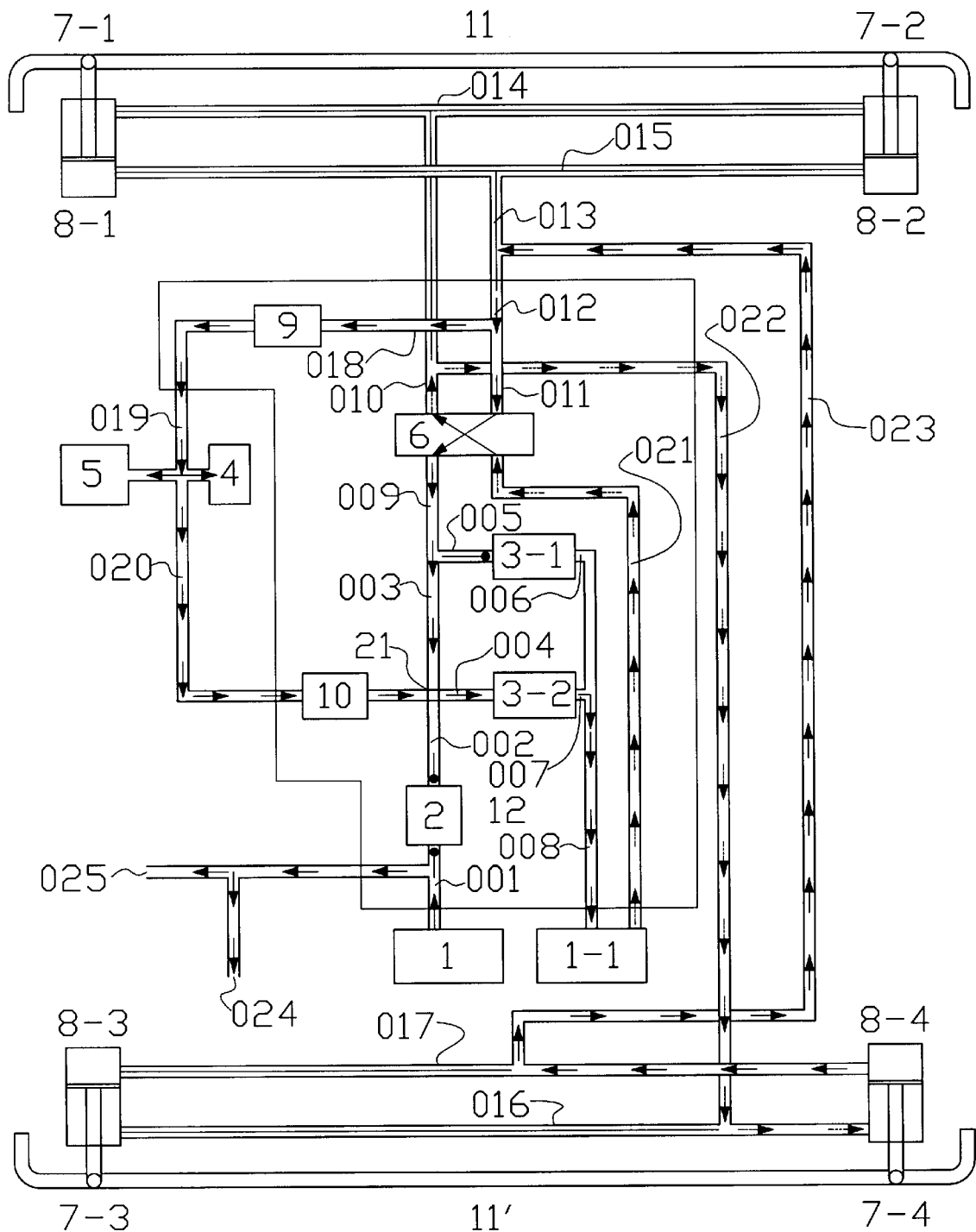
FIG. 1F is a schematic view of the shock-absorbing bumper system in accordance with the present invention, in which brake pedal is depressed and a rightrear collision occurs.

The piston 83 moves inwardly when a collision occurs, working fluid in the tank 1-1 is supplied to the first chamber 84 via the twenty-first oil path 021, the solenoid valve 6, oil paths 010, 022, 016, as indicated by dashed arrows in FIG. 1F. Operation and function of the rightfront microswitch 7-2 are the same as those of the rightrear microswitch 7-4, and thus will not be further described. While the present invention has been explained in relation to its preferred embodiment, it is to be understood that there are various modifications.

Besides, the cut-off valve 2, relief valves 3-1, 3-2, the solenoid valve 6, the check valve 9, and the limiting valve 10, which are installed in the hydraulic block 12.

Figure 10A:
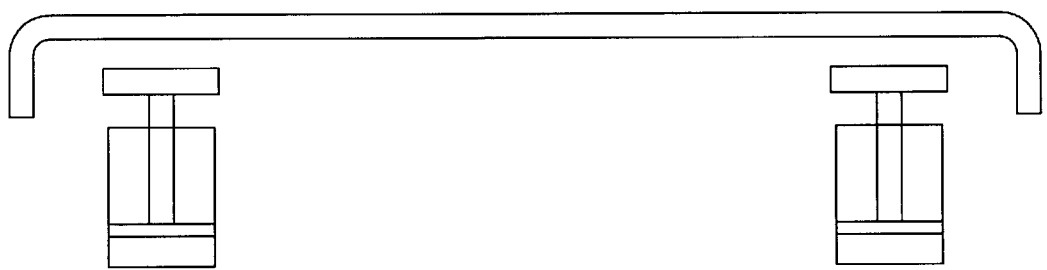
FIGS. 10A through 10B are schematic views showing bumper combined with actuator in the present invention.
Figure 10B:
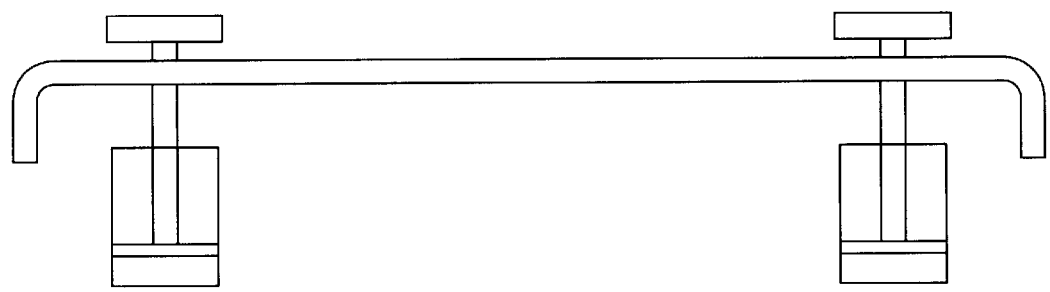

The bumper combined with cylinder has two forms to install. Referring to FIG. 10A, a hidden form, the bumper is fixed on the vehicle, the rear end of the actuator is fixed to the chassis, the piston rod moves inside which can not be observed from outside. Referring to FIG. 10B, a open form, the bumper is fixed on the vehicle, the bumper provides two holes, which are to fit the piston rod of the actuator extending and retracting, the rear end of the actuator is fixed to the chassis.

Therefore, it is to be understood that the invention disclosed herein is intended to cover all such modifications that fall within the scope of the appended claims.

I claim:

1. A shock-absorbing bumper system for an automotive vehicle having a chassis, front and rear bumpers, and a brake pedal, comprising:

a supply subsystem including a storage tank and a pump for pumping hydraulic fluid from the storage tank to a shock-absorbing valve control subsystem which comprises a cut-off valve, two relief valves, a solenoid valve, a check valve, a limiting valve for controlling the direction of the hydraulic fluid, a pressure-balancing subsystem in fluid communication with the valve control subsystem, and front and rear bumper subsystems, including an accumulator and a pressure sensing/controlling means; said front and rear bumper subsystems comprising at least one actuator with a piston slidably received therein defining a first chamber and a second chamber, a rear of the actuator being fixed to the chassis and a piston rod being fixed to the bumper, said bumper subsystems transforming an impact to the bumpers by an object into an increase in pressure of the hydraulic fluid; an electric circuit subsystem including a starter switch, a master switch, a hand brake switch, a brake pedal switch, an automatic switch, a speedometer switch, a maintain switch, a relay, and four microswitches for controlling said valve control subsystem and bumper subsystems.

* * * * *